Aug. 18, 1931.    W. C. TROUT    1,819,799
BEAM HANGER
Filed Nov. 1, 1930    2 Sheets-Sheet 2

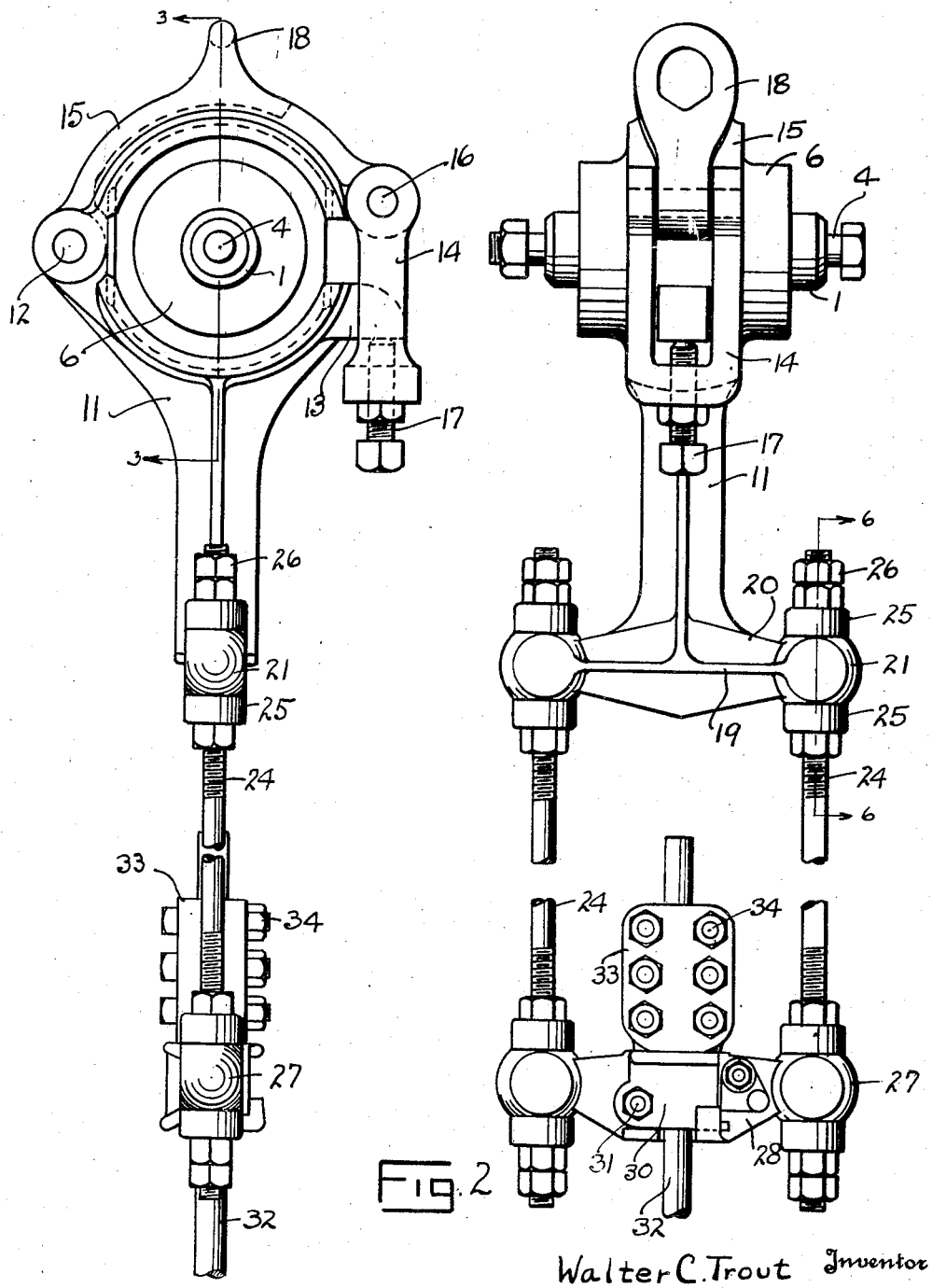

Walter C. Trout, Inventor

By Jesse P. Stone
&
Lester B. Clark
Attorneys

Patented Aug. 18, 1931

1,819,799

UNITED STATES PATENT OFFICE

WALTER C. TROUT, OF LUFKIN, TEXAS

BEAM HANGER

Application filed November 1, 1930. Serial No. 492,737.

My invention relates to beam hangers for use with walking beams with standard rigs for drilling or pumping in oil field operations.

The purpose of the device is to form a connection with the end of the walking beam and the rod, which is employed in reciprocating a pump or the like. In installing a standard rig having a walking beam connection for operation with a pump rod, it is extremely difficult to so weld the heavy walking beam that the end may be positioned correctly over the well which is to be pumped. Furthermore, the walking beam in use may become misaligned so that it is no longer correctly placed even where it has been properly adjusted in the beginning.

It is an object of the invention to provide a beam hanger for connecting the walking beam with the rod to be reciprocated, which will allow for lateral movement from the beam relative to the well, without any direct strain upon the rod.

I contemplate forming a beam hanger, which is flexible, with universal connections therein, which will allow for a certain amount of misalignment or lateral movement of the beam, without exerting a destructive strain upon the pump rod.

I also desire to form an attachment between the beam hanger and the bearing upon the beam, which may easily be detached and removed without the loss of a material amount of time. In the drawings herewith I have shown a preferred embodiment of the invention.

Figure 1 is a side elevation of a beam hanger constructed in accordance with the invention.

Figure 2 is a front elevation thereof.

Figure 3:
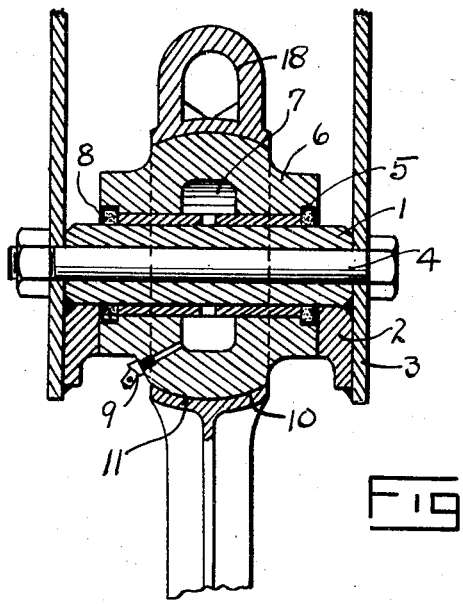
Figure 3 is a broken sectional view showing the inner construction of the yoke at the point where it engages the beam, taken on the line 3—3 of Figure 1.

With particular reference to Figures 2 and 3, it will be seen that my hanger is adapted to be supported upon a bearing support 1, resting upon plates 2 secured upon the inner sides 3 of the walking beam, said bearing support 1 is held in position on the plates 2 by means of a through bolt 4.

Supported upon the bearing support 1 is a bushing 5 of cylindrical form, having thereon a sleeve 6, which is hollowed out at 7 at its inner face to receive lubricant for the bushing 5. On each end of the bushing and near the bearing 6, I employ a packing washer 8 to prevent loss of lubricant that runs along the bearing; and a grease gun connection shown at 9 whereby lubricant may be forced into the recess 7.

The bearing member 6 is formed between its ends with a rounded periphery 10, which is formed on an arc of a sphere so as to rotatably engage the yoke 11 of the hanger.

Figure 6:
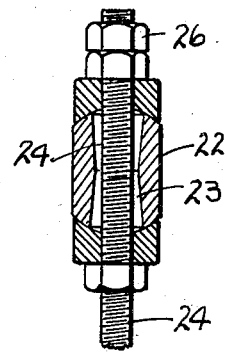
Figure 6 is a longitudinal section taken on the line 6—6 of Figure 2.

The shape of the yoke is shown best in Fig. 1. The upper end thereof is forked and provided at one side with a hinge 12 and on the other side with a projecting lug 13 to be engaged by a swinging latch member 14. The hinge 12 forms a connection between the upper end of the yoke and swinging gate 15, which is arcuate in shape and has at its free end a pivotal connection at 16 with the swinging latch 14. It is to be noted that the yoke and the gate connected therewith are formed on their inner faces to engage about the bearing member 6, and it is also to be noted that this engagement allows a swinging movement of a universal nature as will be understood from Figure 3. The swinging latch 14 is a U-shaped latch, the free end of which has a cap screw 17 therein to engage the lug 13 upon the yoke whereby the yoke may be properly adjusted relative to the bearing. The upper end of the gate member may be formed with an eyelet 18 whereby the device may be more readily handled. The yoke is extended downwardly to a point spaced from the beam and is formed with a crosshead 19 thereon. Said crosshead has two lateral arms 20, which are formed with rounded knobs 21 thereon. As will be seen from Fig. 6, these knobs are flattened on their sides as shown at 22, and have a longitudinal opening 23 extending therethrough. Said opening is flared toward each end so as to allow a lateral swinging movement of the rods 24, which extend through said knobs.

The rods 24 are formed with bearing caps 25 on each side of the knob, and the rods may be adjustable as to length through means of nuts 26 on said rods. It will be understood that the connection between the crosshead and the rods allows a universal swinging movement of the rods relative to the crosshead in the operation of the device.

Figure 4:
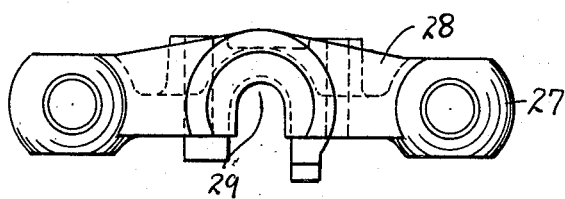
Figure 4 is a top plan view of a rod clamp employed in the invention.
Figure 5:
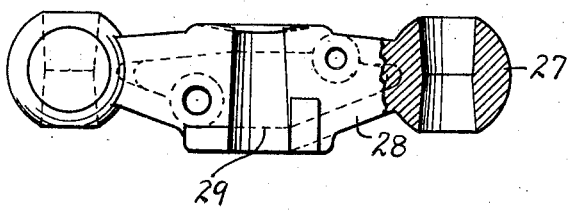
Figure 5 is a front elevation thereof, one of the ends being in section.

The lower ends of the rods 24 are received within knobs 27 in the ends of the clamping member 28. The connection between the rods and the knobs 27 upon the plate 28 is practically identical with the connection previously described with the knobs 21. The plate 28 has a rod-receiving recess 29 therein, which will be best understood from Figs. 4 and 5. This recess is adapted to be closed by a plate or gate 30, which may be secured in position by bolt 31. This plate is intended to form a rigid clamping engagement with the pump rod 32. The upper end of the rod 32 may be further gripped above the clamping plate 28 through means of spaced plates 33 connected by clamping bolts 34. This rod gripping means engaging the plate 28 limits relative downward movement of the rod. This particular construction is not a necessary part of the device.

In the operation of my hanger, it will be seen that the device is sufficiently flexible to allow lateral movement of the beam relative to the pump rod which will prevent undue strain on the pump rod. The yoke is adapted for ready attachment to the beam and is flexible at its upper end and also at the crosshead and the clamping bar.

What I claim as new is:

1. A rod hanger for walking beams including a bearing having a convex outer peripheral bearing area, a yoke including upper and lower jaws pivoted together and shaped to engage and pivot universally about said bearing, a crosshead on the lower end of said yoke, a rounded knob at each end of said crosshead, said knobs having vertically arranged openings therethrough, a rod gripping clamp, knobs on each end thereof shaped like those on said crosshead, and adjustable rods connecting said knobs.

2. A rod hanger for walking beams including a bearing having a convex outer peripheral bearing area, a yoke including upper and lower jaws pivoted together and shaped to engage and pivot universally about said bearing, a crosshead on the lower end of said yoke, a rounded knob at each end of said crosshead, said knobs having vertically arranged openings therethrough, a rod gripping clamp, knobs on each end thereof shaped like those on said crosshead, adjustable rods connecting said knobs, and concaved caps on said rods engaging opposite sides of said knobs to allow swinging of said rods relative to said crosshead.

3. A yoke adapted to engage a bearing at its upper end, a crosshead at its lower end, knobs at the ends of said crosshead, said knobs having longitudinal openings therethrough, a clamping bar, knobs thereon having longitudinal openings therethrough, upper and lower caps on said knobs, rods extending through said caps and said knobs to connect said crosshead and said bar and allow a universal movement about said knobs.

4. A yoke adapted to engage a bearing at its upper end, a crosshead at its lower end, knobs at the ends of said crosshead, said knobs having longitudinal openings therethrough, a clamping bar, knobs thereon having longitudinal openings therethrough, upper and lower caps on said knobs, rods extending through said caps and said knobs to connect said crosshead and said bar, said openings being flared at the upper and lower ends to allow said rods to swing therein, and allow a universal movement about said knobs.

5. A rod hanger for walking beams including a yoke, a detachable bearing connection at its upper end, a crosshead at its lower end, a clamping bar adapted for clamping to a pump rod, rods connecting said crosshead and said clamping bar, and universal connections between said rods and said crosshead and clamping bar.

6. A rod hanger for walking beams including a cylindrical bearing support, a bearing thereon having a convex outer periphery, a yoke, a head thereon detachably engaging about said bearing to swing in any direction thereon, a crosshead on said yoke, a rod clamp, rods connecting said crosshead and said clamp and universal joints in said connections.

In testimony whereof I hereunto affix signature this 27th day of October, A. D. 1930.

WALTER C. TROUT.